US008720016B2

(12) United States Patent  
Beaulieu

(10) Patent No.: US 8,720,016 B2  
(45) Date of Patent: May 13, 2014

(54) SNAP MOUNTING CLIP SYSTEM

(76) Inventor: Dominic Beaulieu, Deerfield Beach, FL (US)

( * ) Notice: Subject to any disclaimer, the term of this patent is extended or adjusted under 35 U.S.C. 154(b) by 486 days.

(21) Appl. No.: 13/022,669

(22) Filed: Feb. 8, 2011

(65) Prior Publication Data

US 2011/0191990 A1 Aug. 11, 2011

Related U.S. Application Data

(60) Provisional application No. 61/302,432, filed on Feb. 8, 2010.

(51) Int. Cl.  
 *F16B 2/20* (2006.01)
(52) U.S. Cl.  
 USPC ............... 24/457; 24/458; 24/662; 24/681; 24/488; 312/140; 312/111
(58) Field of Classification Search  
 USPC ........... 24/457, 458, 488, 662, 681, 104, 108, 24/114.4, 114.05; 403/142, 329, 133, 138; 312/111, 140  
 See application file for complete search history.

(56) References Cited

U.S. PATENT DOCUMENTS

| | | | | |
|---|---|---|---|---|
| 1,224,382 A | * | 5/1917 | Isakson | 24/681 |
| 1,453,809 A | * | 5/1923 | Sirot et al. | 24/108 |
| 2,612,139 A | * | 9/1952 | Collins | 24/681 |
| 2,923,043 A | * | 2/1960 | Gallagher, Jr. | 24/681 |
| 3,309,748 A | * | 3/1967 | Mortensen | 24/662 |
| 3,916,756 A | * | 11/1975 | Yoda | 24/682.1 |
| 4,059,041 A | | 11/1977 | Hassan | |
| 4,063,330 A | * | 12/1977 | Triplette | 24/662 |
| 4,067,532 A | | 1/1978 | Viteretto | |
| 4,176,428 A | * | 12/1979 | Kimura | 24/297 |
| 4,405,272 A | | 9/1983 | Wollar | |
| 4,408,372 A | * | 10/1983 | Kimura et al. | 24/662 |
| 4,420,859 A | | 12/1983 | Hammerle | |
| 4,726,705 A | | 2/1988 | Gomes | |
| 5,028,187 A | | 7/1991 | Sato | |
| 5,369,856 A | * | 12/1994 | Hauser | 24/662 |
| 5,580,204 A | | 12/1996 | Hultman | |
| 5,647,713 A | | 7/1997 | Ge et al. | |
| D392,555 S | | 3/1998 | Glickman et al. | |
| 6,612,796 B2 | | 9/2003 | Gattone | |
| 7,070,355 B2 | | 7/2006 | Abels et al. | |
| D574,700 S | | 8/2008 | Bevirt | |
| 7,677,850 B2 | | 3/2010 | Sano | |
| 2009/0271970 A1 | | 11/2009 | Hanley et al. | |

* cited by examiner

Primary Examiner — Robert J Sandy  
(74) Attorney, Agent, or Firm — Jacqueline Tadros; Jacqueline Tadros, P.A.

(57) ABSTRACT

A clip for releasably securing a panel to a support, including a socket member, and a ball member. The socket member includes a base having a bore positioned at a center point of the base and a collar located around the bore, the collar being partitioned into segment walls separated by gaps. The ball member includes a base having a collar positioned around the center and a cylindrical pillar with a spherical member projecting from a top surface of the base at a generally perpendicular angle to the base. The spherical member of the cylindrical pillar is pushed through the collar of the socket member, causing the segment walls to flex back to allow the spherical member to emerge from above the segment walls and the pillar to be encircled by the segment walls when the segment walls flex back to their original position, resulting in a secure snap fit engagement of the ball and socket members.

17 Claims, 5 Drawing Sheets

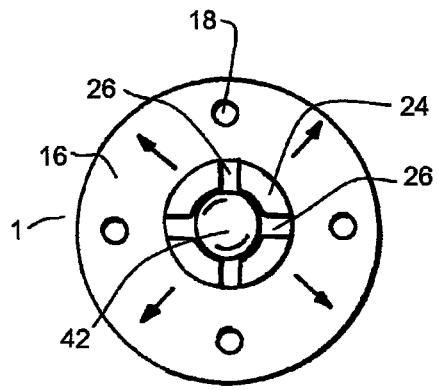
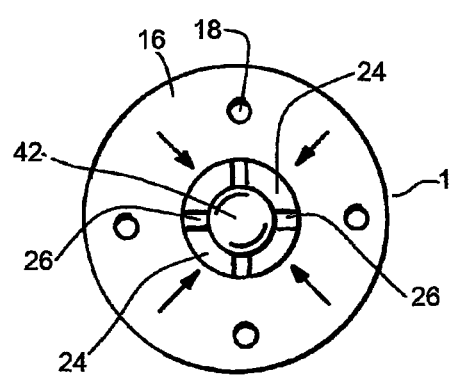
FIG. 7  FIG. 8
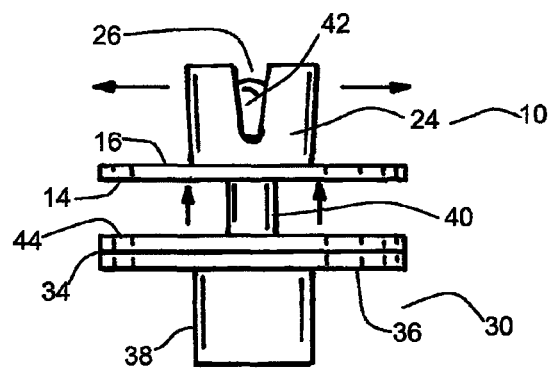
FIG. 9
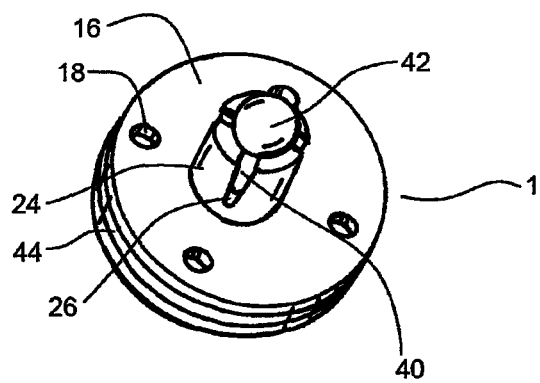
FIG. 10

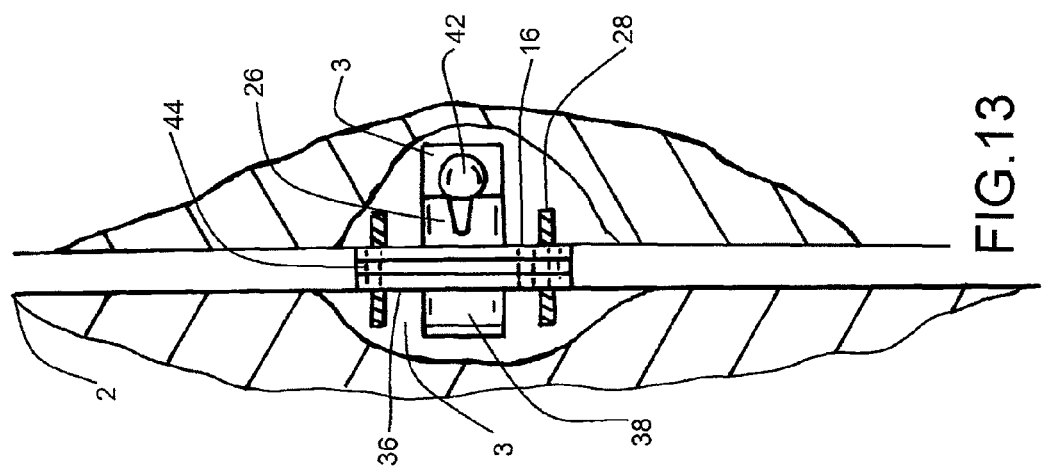
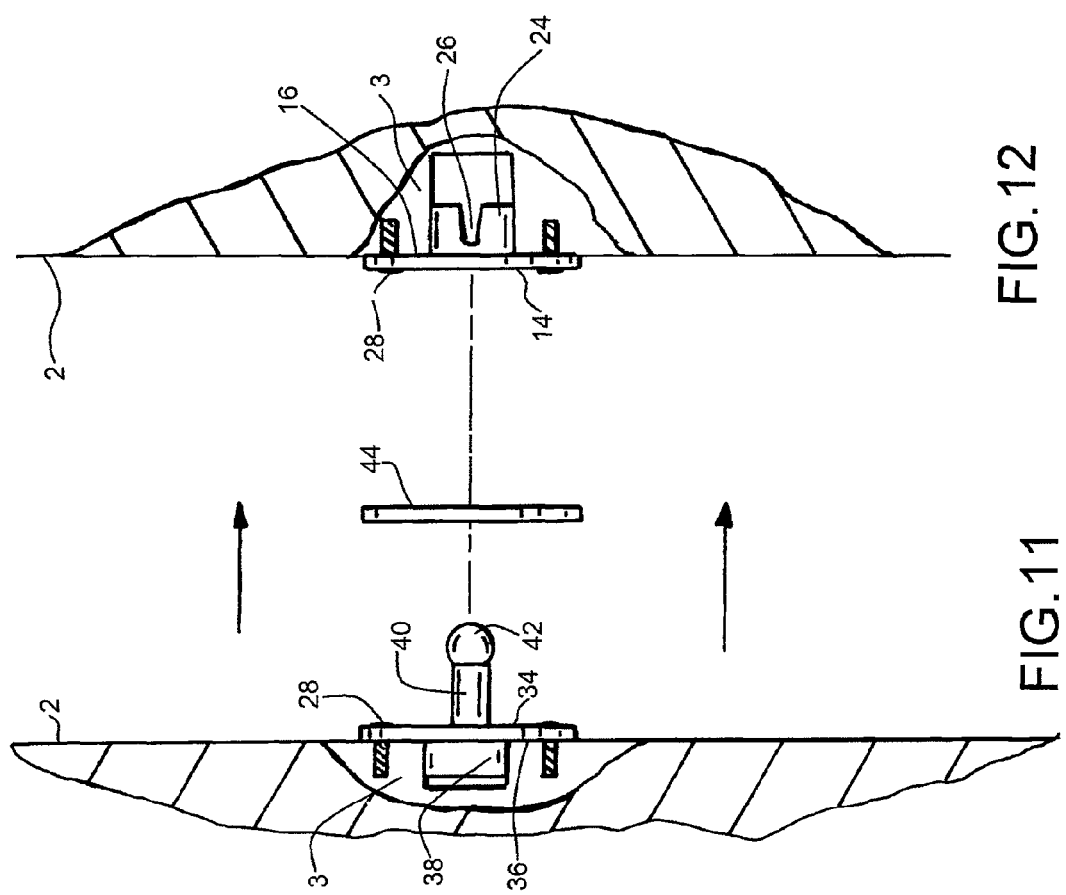

SNAP MOUNTING CLIP SYSTEM

CROSS-REFERENCE TO RELATED APPLICATIONS

Applicant claims priority from Provisional Patent Application No. 61/302,432 filed on Feb. 8, 2010 and entitled HIDDEN FASTENER CLIP SYSTEM under Title 35, United States Code Section 119(e). An entire copy of Provisional Patent Application No. 61/302,432 is incorporated herein by reference.

BACKGROUND OF THE INVENTION

1. Field of the Invention

The present disclosure relates generally to a method and device for installing panels. More particularly, the present invention is directed to a snap mounting clip for installing panels, such that the panels are fixedly secured, but able to be removed as necessary.

2. Description of the Related Art

It is known in the art to use a ball and socket type clip for fastening and mounting panels. Ball and socket joints secure panels to one another and also allow for subsequent separation and reconnection of panels. U.S. Pat. No. 5,647,713 (to Ge et al.) discloses such ball and socket type clip. The Ge et al. patent teaches a panel fastener that includes separable components formed from a relatively rigid and a more flexible plastic. The components are formed in a two shot injection molding process and joined through a ball and socket joint for subsequent separation and reconnection.

U.S. Patent Publication No. 2009/0271970 (to Hanley et al.) discloses a panel mounting clip that includes a plug and socket component. The socket component includes a cup open to at least one end, an external thread for engaging the support structure and a constriction in the cup spaced away from the bottom of the cup.

Another ball and socket type fastener is discussed in U.S. Pat. No. 4,067,532 to Viteretto. The Vitretto patent teaches a two part removable fastening attachment for temporarily hanging an article. The socket surrounds the ball on all but one open side which permits sliding of the ball into the socket, the ball then contacts the portion if the socket surrounding it.

Other fasteners include two part panel fasteners having a socket member and a stud member as disclosed in U.S. Pat. No. 4,420,859 (to Hammerle).

The prior art discloses panel fasteners for removably securing panels. However, there remains a need for an improved method and device for installing panels that provides ease of installation and stability.

There is a need for an improved method and device for installing panels such that the panels are fixedly secured, but also amenable to subsequent separation and reconnection.

SUMMARY OF THE INVENTION

As described herein, the various exemplary embodiments of the present invention overcome one or more disadvantages known in the art.

In accordance with the present invention a snap mounting clip is provided, having a ball and socket connection.

In one aspect of the present disclosure, holes measuring approximately ½ inch in diameter are drilled through two or more panels at a point where the panels are to be secured to one another. The ball and socket components of the snap mounting clip are fastened to the respective panels. The ball and socket components are pressed together in a snap-fit engagement to secure the panels. The panels may be separated simply by pulling a panel to release the snap-fit engagement of the ball and socket components.

According to another aspect of the disclosure, the ball component includes a base with a cylindrical pillar that projects outward and perpendicular to the base at a center point of the base. The tip of the pillar includes a round spherical member.

In yet another aspect of the invention, the socket component includes a base with a cylindrical collar positioned on the underside and at the center of the base. The collar portion of the socket component is embedded in the panel when the socket component is secured to the panel.

In a further aspect of the present invention, the cylindrical collar of the socket component is partitioned into four equal segment walls forming a bore in the center of the collar. There is a gap or channel between each segment wall. Thus, as the spherical member is pushed through the bore of the collar, the segment walls flex outward and the channel space expands to allow the spherical member to push through the segment walls.

A snap fit engagement of the ball and socket components is achieved as the spherical member emerges from the segment walls and the walls flex inwardly to return to their original position and surround the pillar.

To attach two panels or a panel and supporting structure, drill ½" hole through the panels or panel and supporting structure at a common point. The segment walls of the socket member of the clip will expand as the spherical member of the ball member is pushed through. To adjust tension, the hole in the panel or supporting structure made be made slightly bigger to release the pressure created by the segment walls as they expand. Fastening the clip to its material can be done with using flat head screws or using Chemicals Concept's epoxy.

When the panels or panel and supporting structure are brought together, the ball and socket components mate in a snap fit mechanical engagement. The panels can be separated without tools. In a preferred embodiment, the clips of the present invention are around the perimeter of a panel or supporting structure, 2 inches from the edge and no more then 24 inches apart. The preferred configuration of the clips will depend on the material of the panel.

It is an object of the present invention to provide a means of securing panels in a fixed arrangement while providing for subsequent separation and reconnection without the need for special tools.

An advantage of the present invention is that it preserves its retention power with multiple uses.

These and other aspects and advantages of the present disclosure will become apparent from the following detailed description of preferred embodiments of the invention considered in conjunction with the accompanying drawings, in which like drawings represent like components. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE DRAWINGS

FIG. 7 is a view of the segment walls of the collar of the socket component of the clip of the present invention flexing back as the ball and socket components are pressed together in a snap fit engagement.

FIG. 8 is a view of the segment walls of the collar of the socket component of the clip of the present invention returning to their original position are the ball and socket components are secured in a snap fit engagement.

FIG. 9 is a side view of the ball and socket components of the present invention as the spherical member of the ball component is pushed through the collar of the socket component and the segment walls flex back.

FIG. 10 is a perspective view of the ball and socket components of the present invention secured in snap fit engagement.

FIG. 11 is a side cutaway view of the ball component of the clip of the present invention secured to a panel.

FIG. 12 is a side cutaway view of the socket component of the clip of the present invention secured to a panel.

FIG. 13 is a side cutaway view of the panels of FIGS. 11 and 12 affixed to one another when the ball and socket components of the clip of the present invention are secured in snap fit engagement.

DETAILED DESCRIPTION OF THE DRAWINGS

Figure 1:
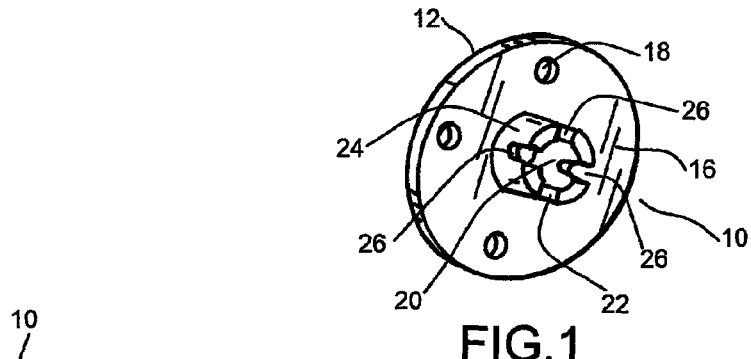
FIG. 1 is a side perspective view of the socket component of the clip of the present invention.

The present invention is a clip for securing a panel, designated as 1 in the drawings, as illustrated in FIGS. 1-14B. The clip 1 includes a socket component 10 and a ball component 30. In a preferred embodiment, the clip 1 is fabricated from a nylon blend with a fire retardant.

The socket component 10 and includes a base 12 having a top 14 and bottom 16 surface. The base 10 includes a plurality of apertures 18 positioned along the perimeter of the base for receiving screws 28. As will be appreciated by one reasonably skilled in the art, nails, rivets or the like may also be used in place of screws 28 for fastening the base 12 to a panel 2. The base 12 may also be secured to a panel 2 using an epoxy compound. In a preferred embodiment, the socket component is a unitary member.

A bore 20 is positioned at a center point of the base 12 and a collar 22 projects outward from the bottom surface of the base 12 around the bore 20. The collar 22 is generally perpendicular to the base 12 and is partitioned into segment walls 24. In a preferred embodiment the collar 22 is equally partitioned into four segment walls 24. A space defining a channel 26 separates the segment walls 24. The channels 26 run along the side of each segment wall 24. In a preferred embodiment, the channels 26 are generally U shaped. In yet, another preferred embodiment, the channels 26 are generally in the shape of an elongated U.

A ball component 30 includes a base 32 having a top 34 and bottom 36 surface. The base 32 includes a plurality of apertures 18 positioned along the perimeter of the base for receiving screws 28. As will be appreciated by one reasonably skilled in the art, nails, rivets or the like may also be used in place of screws 28 for fastening the base 32 to a panel 2. The base 32 may also be secured to a panel 2 using an epoxy compound. In a preferred embodiment, the ball component 30 is a unitary member.

The bottom surface 36 of the base 32 includes a collar 38 that is positioned around a center point region of the base 32. In a preferred embodiment, the collar 38 is cylindrical and projects upward from the bottom 36 of the base 32 at a perpendicular angle.

The top surface 34 of the base 32 includes a cylindrical pillar 40 positioned at the center of the base 32. The cylindrical pillar 40 projects upwards from the top surface 34 of the base 32 at a perpendicular. The cylindrical pillar 40 has a spherical member 42 at its tip at a distal most point from the base 32. In a preferred embodiment, the cylindrical pillar 40 is of a height approximately equal to the sum of the height of the segment walls 24 and the width of the base 12 of the socket component 10.

The diameter of the spherical member 42 is slightly less than the diameter of the bore 20 allowing the spherical member 42 to be pushed through the bore 20 of the collar 22. As the spherical member 42 is pushed through the bore 20 of the collar 22, the segment walls 24 flex outward and the channels 26 expand to allow the spherical member 42 to push through the segment walls 24.

A snap fit engagement of the ball 10 and socket 30 components is achieved as the spherical member 42 emerges from above the segment walls 24 and the walls flex inwardly to return to their original position and surround the pillar 40. When the ball 10 and socket 30 components are fully engaged, the top 34 surface of the base 32 of the ball component 30 rests in complementary contact with the top 14 surface of the base 12 of the socket 30 component. Alternatively, in another embodiment a gasket 44 or insulation pad is placed over the base 32 of the ball component 30 prior to securing the ball component 30 to the socket component 10. Thus, the top surface 34 of the base 32 of the ball component 30 rests in complementary contact with a surface of the gasket 44 and the top 14 surface of the base 12 of the socket component 10 rests in complementary contact with the opposite surface of the gasket 44 when the ball and socket components 10, 30 are secured in snap fit engagement.

Referring now to the drawings, FIG. 1 is a side perspective view of the socket component 10 of the clip 1 of the present invention. A plurality of apertures 18 are positioned along the perimeter of the base 12. The collar 22 is positioned at the center of the base 12 and projects outward from the bottom surface 16 of the base 12 at a perpendicular to the base 16.

Figure 2:
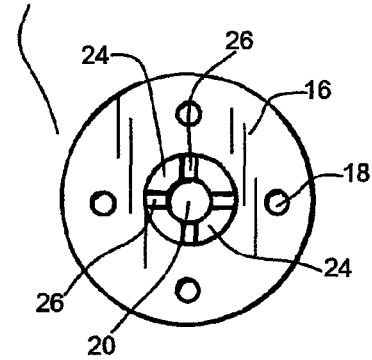
FIG. 2 is a bottom view of the socket component of the clip of the present invention.

FIG. 2 is a bottom view of the socket component 10 of the clip 1 of the present invention. There is shown the bore 22 at the center of the base 12. In a preferred embodiment four apertures 18 are evenly positioned along the perimeter of the base 12.

Figure 3:
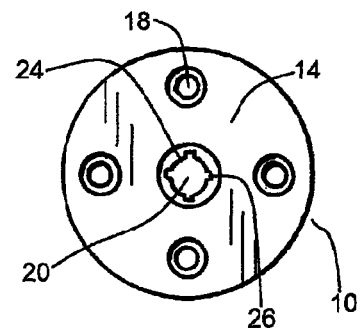
FIG. 3 is a top view of the socket component of the clip of the present invention.

FIG. 3 is a top view of the socket component 10 of the clip 1 of the present invention. The collar 22 is positioned at the center of the base and 12 projects outward from the bottom surface 16 of the base 12 at a perpendicular to the base 12. In a preferred embodiment, the collar 22 is equally partitioned into four segment walls 24. The walls 24 are separated by spaces that form a channel 26 that runs along the side of each segment wall 24 as shown in FIGS. 1-3.

Figure 4:
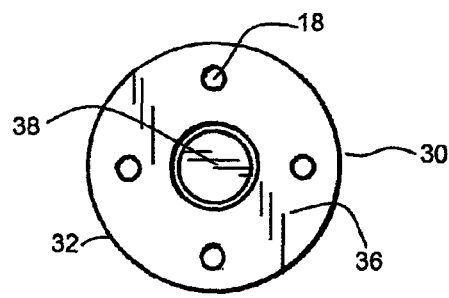
FIG. 4 is a bottom view of the ball component of the clip of the present invention.

FIG. 4 is a bottom view of the ball component 30 of the clip 1 of the present invention. There is shown a cylindrical collar 38 positioned at the center of the base 32 projecting from the bottom surface 36 of the base 32 at a perpendicular angle.

Figure 5:
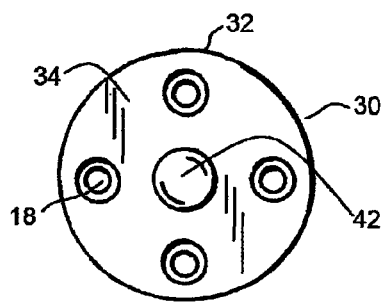
FIG. 5 is a top view of the ball component of the clip of the present invention.

FIG. 5 is a top view of the ball component 30 of the clip 1 of the present invention. There is shown the spherical member 42 of the cylindrical pillar 40 and four apertures positioned evenly along the perimeter of the base 32.

Figure 6:
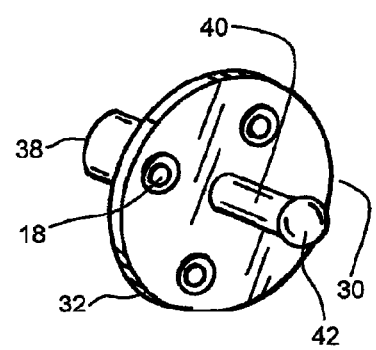
FIG. 6 is a side perspective view of the ball component of the clip of the present invention.

FIG. 6 is a side perspective view of the ball component 30 of the clip 1 of the present invention. A plurality of apertures 18 are positioned along the perimeter of the base 32. The cylindrical pillar 40 projects upwards from the top surface 34 of the base 32 at a perpendicular. There is shown the spherical member 42 at the uppermost tip of the cylindrical pillar 40. In a preferred embodiment, the collar 38 is positioned opposite the cylindrical pillar 40 and projects upward from the bottom 36 of the base 32 at a perpendicular angle to the base 32.

FIG. 7 is a view of the segment walls 24 of the collar 22 of the socket component 10 flexing back as the ball and socket components, 10, 30 of the clip of the present invention are pressed together in snap fit engagement. The spherical member 42 emerges from the segment walls 24 while the cylindrical pillar 40 is surrounded by the segment walls.

FIG. 12 is a side cutaway view of the socket component 10 of the clip 1 of the present invention secured to a panel 2. A hole 3 is drilled in the panel 2. The diameter of the hole 3 should be slightly larger than the diameter of the collar 22. In a preferred embodiment, the hole is ½" in diameter. The depth of the hole 3 in the panel 2 should sufficiently exceed the height of the segment walls 24 to provide a gap sufficient to allow the spherical member 42 of the pillar 40 to emerge from the segment walls 24 when the ball and socket components 10, 30 are fixed in snap fit engagement. As is shown, screws 28 are inserted through the apertures 18 of the base 12 of the socket component 10 to affix the base 12 to the panel 2. The collar 22 is placed inside the hole 3, and embedded in the panel 2.

FIG. 11 is a cutaway view of the ball component 30 of the clip 1 of the present invention secured to a panel 2. A hole 3 is drilled in the panel 2. The diameter of the hole 3 should be slightly larger than the diameter of the collar 38. In a preferred embodiment, the hole 3 is ½" in diameter. The depth of the hole 3 in the panel 2 should equal the height of the collar 38. As is shown, screws 28 are inserted through the apertures 18 of the base 32 of the ball component 30 to affix the base 32 to the panel 2. The cylindrical pillar 40 projects upwards from the top surface 34 of the base 32 at a perpendicular. The cylindrical pillar 40 has a spherical member 42 at its tip at a distal most point from the base 32.

FIG. 13 is a side perspective view of the panels of FIGS. 11 and 12 affixed to one another and shows the ball and socket components 10, 30 of the clip 1 of the present invention secured in a snap fit engagement. In a preferred embodiment as shown, the gasket 44 or insulation pad is place over the base 32 of the ball component 30 prior to securing the ball component 30 to the socket component 10. The spherical member 42 of the pillar 40 emerges above the segment walls 24 of the collar 22 of the socket component 10 when the ball and socket components 10, 30 are snapped together.

FIG. 9 illustrates the spherical member 42 being pushed through the bore 20 of the collar 22 and the generally U shaped channel space 26 expanding as the segment walls 24 flex outwardly to allow the spherical member 42 to push through the bore 20 and emerge from the segment walls 43.

FIG. 8 illustrates the inward flexing of the segment walls 24 as they return to their original position once the spherical member 42 completely emerges from the segment walls 24 and the ball and socket 10, 30 components are secured in snap fit engagement.

FIG. 10 is a perspective view of the ball and socket components 10, 30 of the clip 1 of the present invention secured in snap fit engagement with an insulation pad 44 placed between the ball and socket components 10, 30.

Figure 14A:
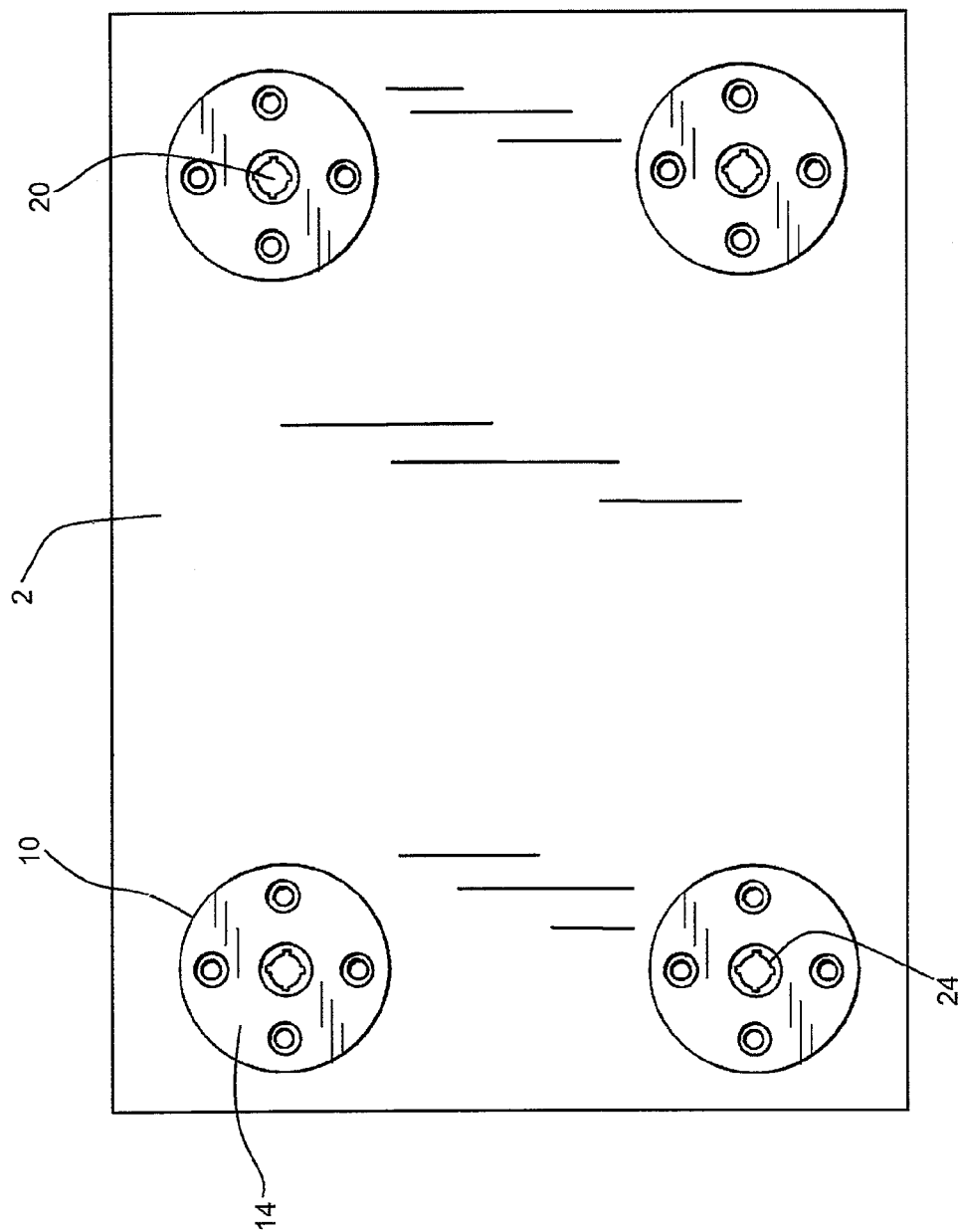
FIG. 14A is a top view of four socket components of the clip of the present invention affixed to a panel.
Figure 14B:
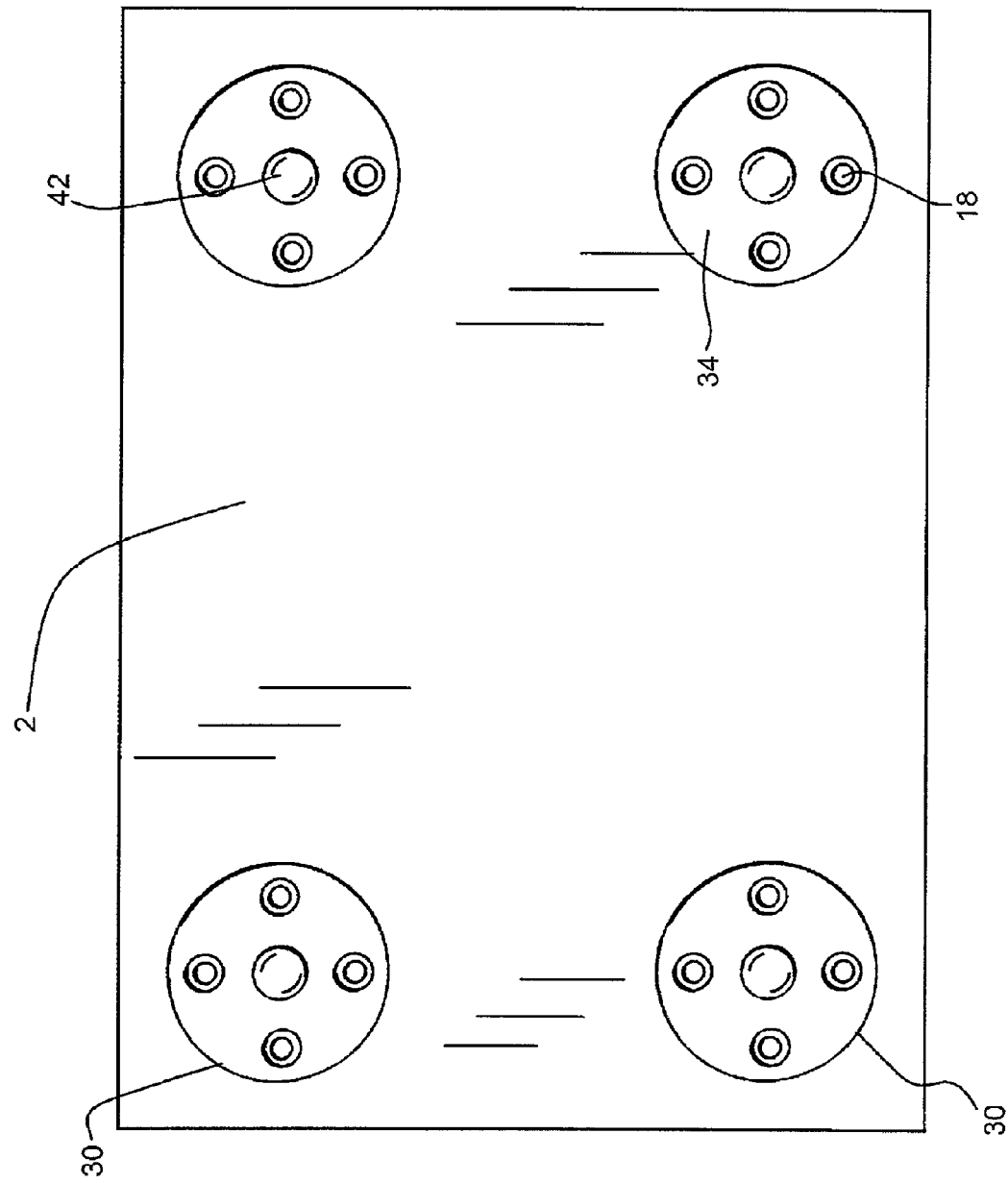
FIG. 14B is a top view of four ball components of the clip of the present invention affixed to a panel.

FIGS. 14A and 14B illustrate the socket and ball components 10, 30 respectively, secured to a panel along its periphery. In a preferred embodiment socket components are spaced 2 inches from the edge and no more then 24 inches apart. As will be appreciated by one reasonably skilled in the art socket components 10 may also be affixed in the center region of the panel 2. The ball components 30 are affixed to a panel 2 and configured to mate with the ball components.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed is:

1. A clip for releasably securing a panel to a support, the clip comprising:
a socket member, including a base, the base having a bore positioned at a center point of the base and a collar located around the bore and projecting upward at a generally perpendicular angle from a bottom surface of the base, the collar being partitioned into a plurality of segment walls, wherein each segment wall is separated by a gap; and
a ball member, including a base, the base having a collar positioned around a center point region of the base projecting outward at a generally perpendicular angle from a bottom surface of the base, the ball member further comprising a cylindrical pillar projecting upward from a top surface of the base at a generally perpendicular angle to the base, the cylindrical pillar having a generally spherical member at its tip at a distal most point from the ball member base; wherein the diameter of the generally spherical member is less than the diameter of the bore for allowing the spherical member to be pushed through the bore and the segment walls of the socket member, resulting in a snap fit engagement of the ball and socket members when the cylindrical pillar is encircled by the segment walls and the spherical member emerges from above the segment walls.

2. The clip of claim 1 wherein the cylindrical pillar has a height approximately equal to the sum of the height of the segment walls and the width of the base of the socket component.

3. The clip of claim 1 wherein the socket member is a unitary structure.

4. The clip of claim 1 wherein the ball member is a unitary structure.

5. The clip of claim 1 further comprising an isolation pad for placement on the base of the ball member, prior to pushing the spherical member of the cylindrical pillar through the bore.

6. The clip of claim 1 wherein a plurality of apertures are positioned along the perimeter of the base of the ball member.

7. The clip of claim 1 wherein a plurality of apertures are positioned along the perimeter of the base of the socket member.

8. The clip of claim 1 wherein the gap between the segment walls defines a generally U shaped channel.

9. The clip of claim 1 wherein the collar of the socket component is equally partitioned into four segment walls.

10. The clip of claim 1 further comprising means for affixing the ball and socket members to panels.

11. A method of removably securing panels comprising:
drilling a hole through at least two panels at a common point where the panels are to be secured to one another;
affixing a socket member of a clip to a first panel, wherein the socket member includes a base, the base having a bore positioned at a center point of the base and a collar located around the bore and projecting upward at a generally perpendicular angle from a bottom surface of the base, the collar being partitioned into a plurality of segment walls, wherein each segment wall is separated by a gap;
affixing a ball member of a clip to a second panel, wherein the ball member, includes a base, the base having a collar positioned around a center point region of the base projecting outward at a generally perpendicular angle from a bottom surface of the base, the ball member further comprising a cylindrical pillar projecting upward from a top surface of the base at a generally perpendicular angle to the base, the cylindrical pillar having a generally spherical member at its tip at a distal most point from the ball member base; wherein the diameter of the generally spherical member is less than the diameter of the bore; and
securing the first panel to the second panel by inserting the spherical member through the bore and the segment walls of the socket member, resulting in a snap fit engagement of the ball and socket members when the cylindrical pillar is encircled by the segment walls and the spherical member emerges from above the segment walls.

12. The method of claim 11 wherein the hole in each panel measures approximately one half inch in diameter.

13. The method of claim 11 wherein the ball and socket members are affixed to the first and second panels using flat head screws.

14. The method of claim 11 wherein the ball and socket members are affixed to the first and second panels using an epoxy resin.

15. The method of claim 11 wherein at least one panel is a supporting structure.

16. The method of claim 11 wherein the hole is drilled two inches from the edge of a panel.

17. The method of claim 16 wherein a plurality of holes are drilled within twenty four inches of one another along a perimeter of a panel.

* * * * *